Dec. 15, 1942.   B. C. GOLDEN   2,304,908
TAGGING MACHINE FOR TOBACCO BAGS AND THE LIKE
Filed Oct. 18, 1940   7 Sheets-Sheet 1

Inventor
BERTIE C. GOLDEN.
By Munson H. Lane
Attorney

Dec. 15, 1942.  B. C. GOLDEN  2,304,908
TAGGING MACHINE FOR TOBACCO BAGS AND THE LIKE
Filed Oct. 18, 1940  7 Sheets-Sheet 3

Inventor
BERTIE C. GOLDEN.

By Munson H. Lane
Attorney

Dec. 15, 1942.   B. C. GOLDEN   2,304,908
TAGGING MACHINE FOR TOBACCO BAGS AND THE LIKE
Filed Oct. 18, 1940   7 Sheets-Sheet 4

Inventor
BERTIE C. GOLDEN.
By Munson H. Lane
Attorney

Dec. 15, 1942.  B. C. GOLDEN  2,304,908
TAGGING MACHINE FOR TOBACCO BAGS AND THE LIKE
Filed Oct. 18, 1940  7 Sheets-Sheet 5
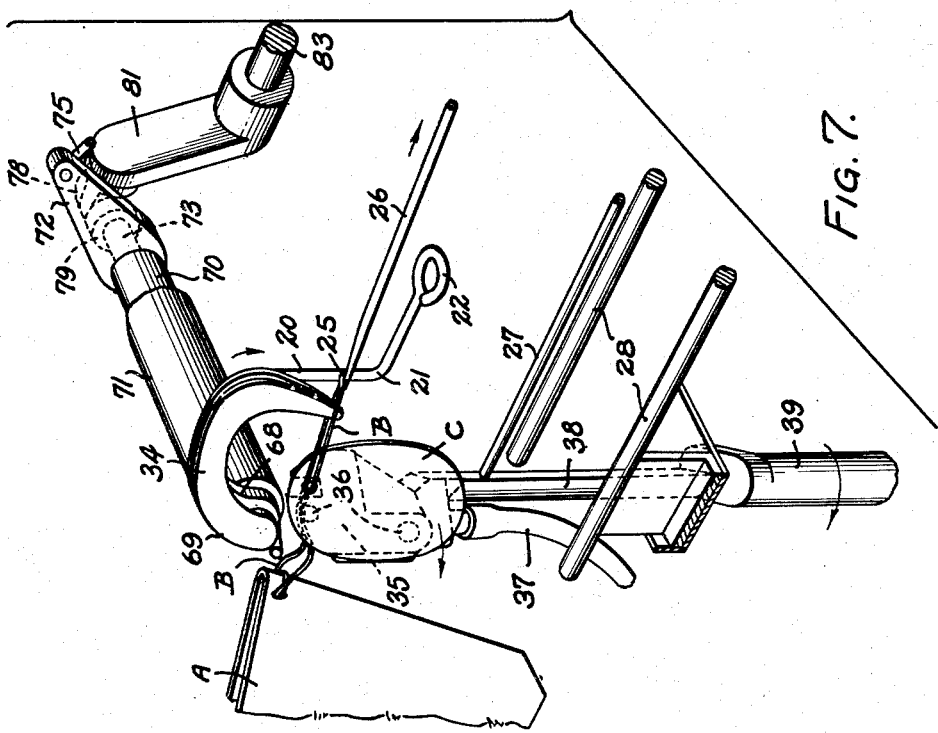
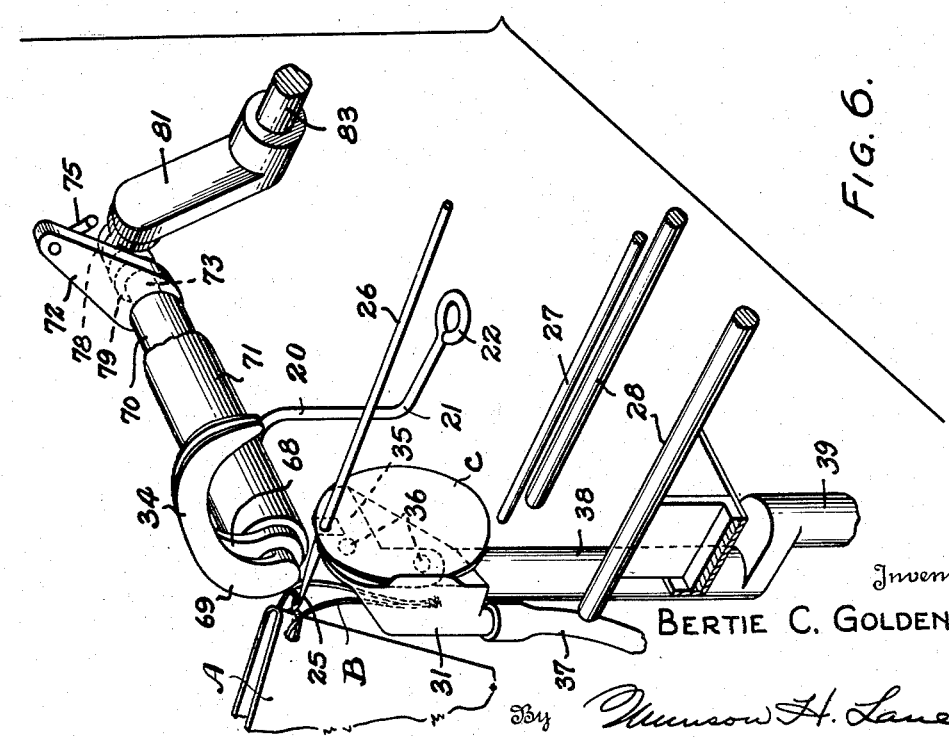
Inventor
BERTIE C. GOLDEN
By Munson H. Lane
Attorney Dec. 15, 1942.　　　　B. C. GOLDEN　　　　2,304,908
TAGGING MACHINE FOR TOBACCO BAGS AND THE LIKE
Filed Oct. 18, 1940　　　7 Sheets-Sheet 6
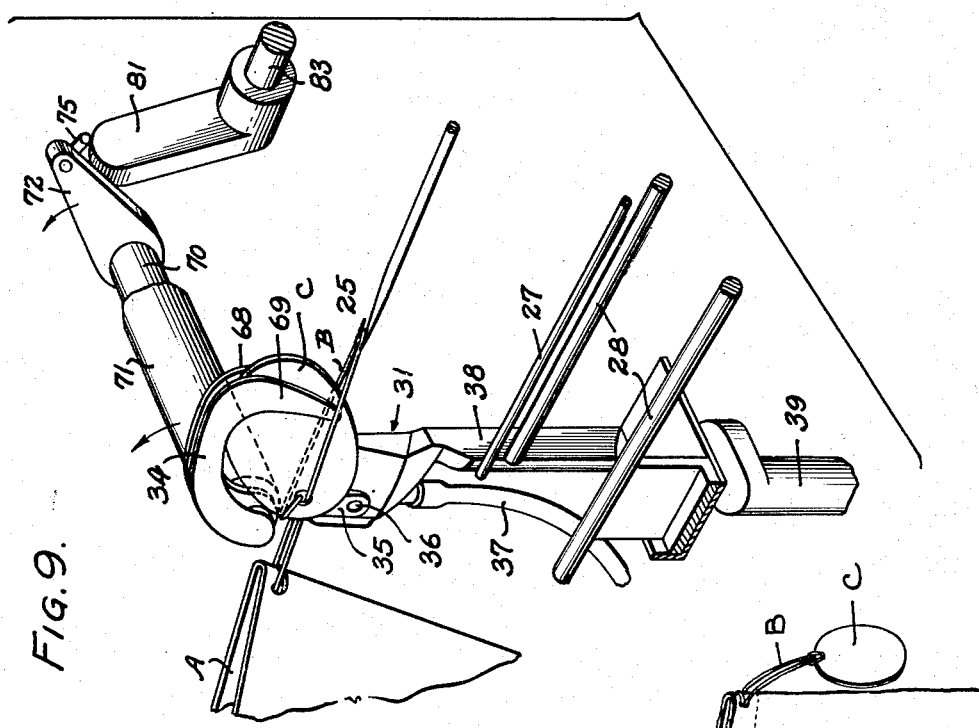
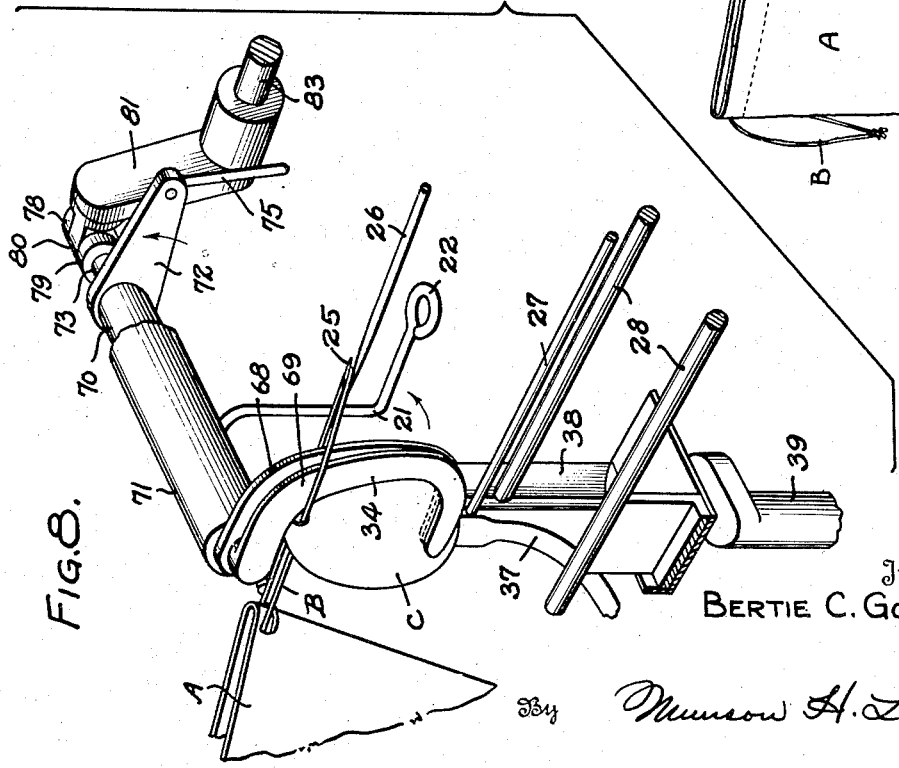
Inventor
BERTIE C. GOLDEN.
By Munson H. Lane
Attorney Dec. 15, 1942.　　　B. C. GOLDEN　　　2,304,908
TAGGING MACHINE FOR TOBACCO BAGS AND THE LIKE
Filed Oct. 18, 1940　　　7 Sheets-Sheet 7

Inventor
BERTIE C. GOLDEN.
By Munson H. Lane
Attorney

Patented Dec. 15, 1942

2,304,908

UNITED STATES PATENT OFFICE 2,304,908

TAGGING MACHINE FOR TOBACCO BAGS AND THE LIKE

Bertie C. Golden, Reidsville, N. C., assignor to Millhiser Bag Company, Inc., Richmond, Va., a corporation of Virginia Application October 18, 1940, Serial No. 361,790

10 Claims. (Cl. 112—104)

The invention relates to machines for applying tags to the strings of tobacco bags or the like. The machine may be used in connection with either filled or empty bags and any suitable means may be employed for feeding the bags and the tags to the tagging mechanism per se. For example a bag to be tagged may be held in the hand of an operator in proximity to the tagging mechanism, or the tagging machine may be arranged in operative and in timed relation to a suitable bag stringing machine, or to a bag filling machine. Thus, the tagging machine of the present invention may be used in connection with a bag stringing machine such as is disclosed in my application Serial No. 346,645, filed July 20, 1940. In such case the tagging mechanism would be arranged to coact with the bag delivering means shown in Fig. 41 of that application.

The tagging mechanism may also be adapted for use in connection with the delivering means of other types of bag stringing machines as for example the type disclosed in Dalton Patent No. 1,036,973, dated August 27, 1912, or it may be employed in conjunction with the delivery means of bag filling machines of various types.

Heretofore tags have generally been applied to the strings of tobacco bags and the like by a hand operation which is a rather expensive process particularly during periods of labor scarcity. A few machines have been designed for applying tags or labels to articles of various sorts, but such machines are in general complicated and expensive as compared with the very simple construction set forth in the present application. The tagging process of the present invention involves the steps of delivering a tag having an aperture therein to the path of a needle or hook, passing the needle through the opening and grasping the draw strings at one side of the bag to which the tag is to be applied, withdrawing the needle through the tag opening carrying with it the looped draw string, after which the tag is turned at an angle of 90° while at the same time a gripper member passes between the two strands of the loop and then grips the tag, carries it back through the loop, thereby securing the tag to the draw string, after which the loop is released by the needle, the bag with the tag applied thereto replaced by another bag and the operation repeated.

The invention will be more readily understood by reference to the accompanying drawings and the following detailed description in which are set forth by way of example an illustrative embodiment of the invention, it being understood that numerous modifications and variations may be resorted to without departing from the spirit of the invention.

Figs. 4-9 inclusive are perspective views of the principal operating parts of the tagging mechanism showing successive stages of the tagging operation.

Fig. 10 is a view showing a bag with a tag applied thereto.

Figure 11:
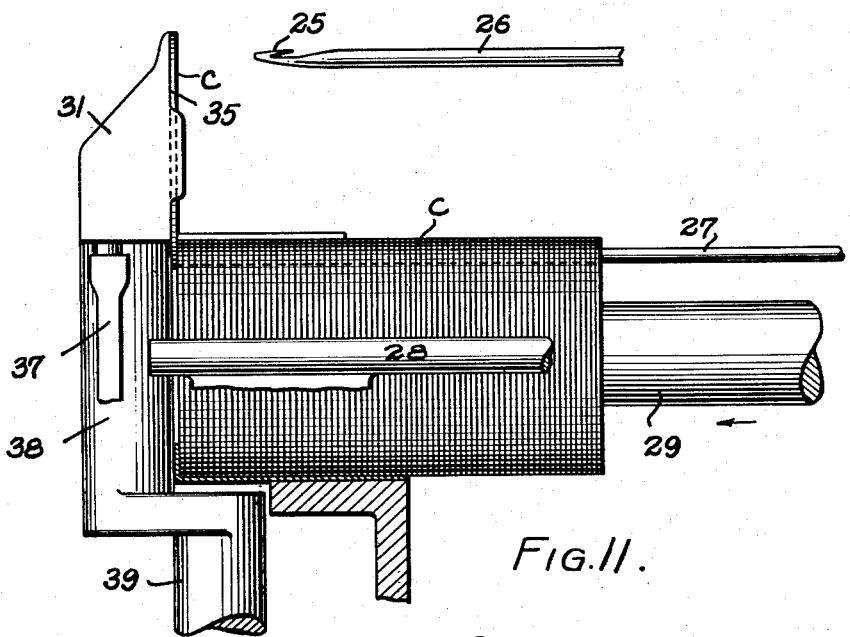
Figure 12:
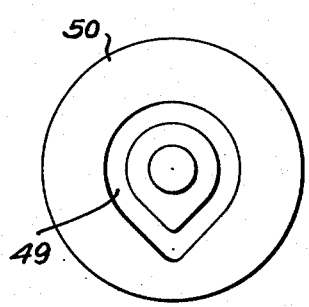
Figure 13:
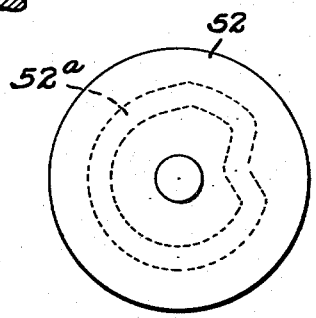
Figure 14:
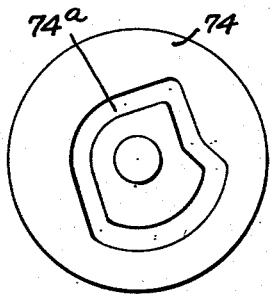
Figure 15:
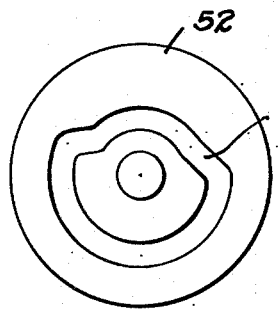
Figure 16:
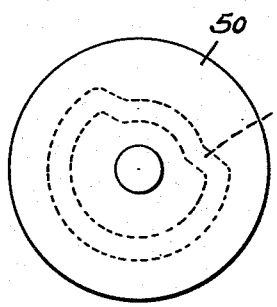

Fig. 11 is a side view of the tag feeding mechanism.

Figs. 12-16 inclusive are views showing the respective cam members employed in operation of the various moving parts of the apparatus.

Referring in detail to the drawings, A denotes a suitable bag, herein shown as a tobacco bag, provided with a pair of draw strings whose looped or knotted ends B project beyond the bag, it being the object of the present invention to attach a tag to one of these looped ends. The bag may be supported in any suitable manner in operative relation to the tagging mechanism, and as herein shown (Figs. 1 and 2) the bag is suspended from a pair of holding members 10 carried by rods 11, 11 which are slidably and rotatably mounted in bearings 12, 12 carried by a bracket 13 suitably secured to a fixed portion of the frame of the machine. In order that the bag holding members or fingers 10 may firmly grip the bag they are normally constrained away from each other by means of a suitable tension spring 14 the ends of which are secured to projections 15, 15 extending from collars 16, 16 secured to the rods 11, 11. A tie rod 17 is provided with bearing members 18, 18 through which the ends 19 of the rods 11 pass. The frame composed of the rods 11, 11 and cross member 17 may comprise the bag delivering means of another machine such as a bag stringing machine and in such case the rods 11, 11 are moved in timed relation both to the stringing mechanism and to the tagging mechanism. The frame is given an intermittent reciprocatory movement by any suitable means, not shown, serving to bring the bag into operative relation to the tagging mechanism, and when the tagging operation is completed the rods 11 are rotated against the tension of the spring 14 so as to move the bag supporting fingers toward each other, and thus release the bag, after which another bag is grasped and delivered to the machine. Other forms of bag feeding mechanism may be employed or the bag may be brought into tagging position and supported by hand.

Figure 1:
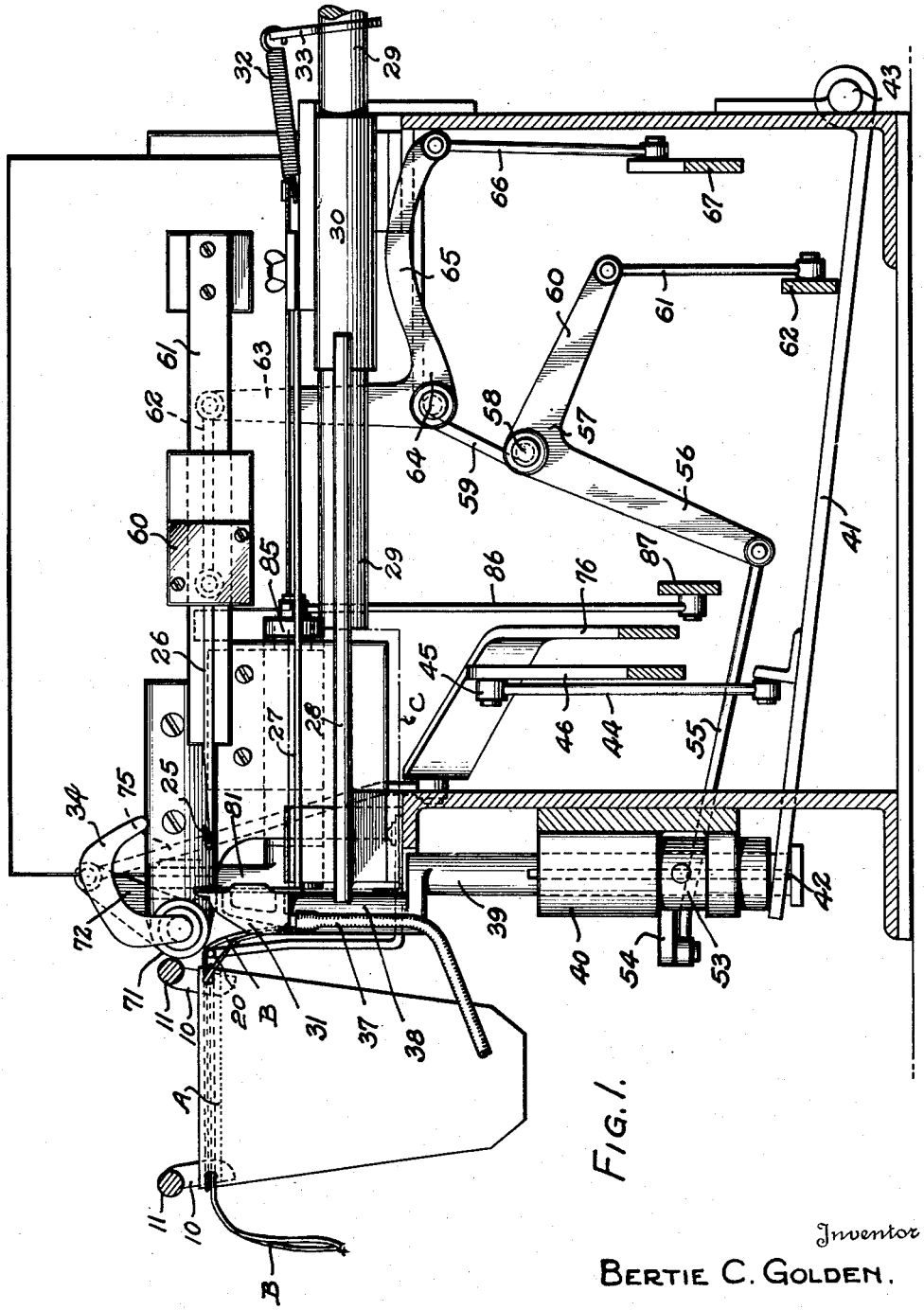
Fig. 1 is a front elevation of the tagging machine, embodying the invention.
Figure 3:
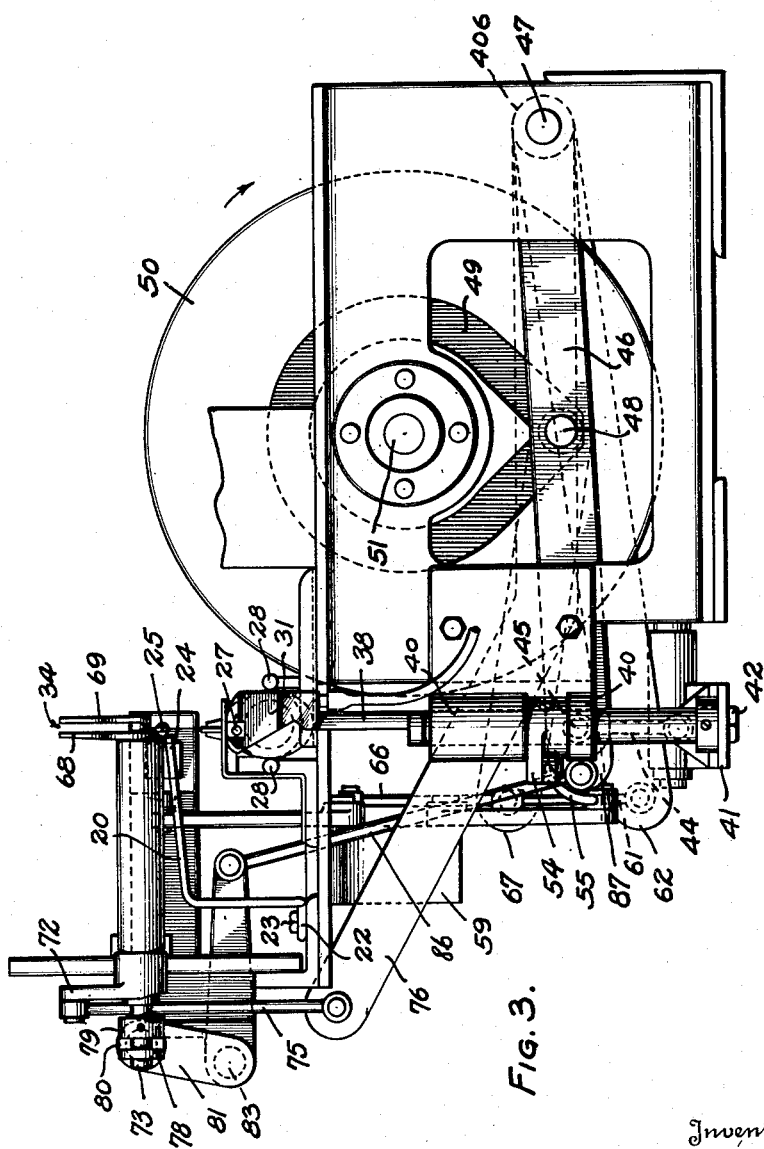
Fig. 3 is a side elevation of the tagging machine with the bag delivering means removed.

As the bag is moved toward the tagging position one of the looped ends B rides over a suitable guide member 20 (Fig. 3) herein shown as in the form of a wire bent at 21 intermediate its ends and provided with a loop 22 at one end by means of which the guide member is secured to the frame of the machine by any suitable fastening means 23. The end 24 of the guide member is in close proximity to the tagging mechanism per se, and the bag feeding mechanism hereinbefore described is adapted to bring the bag to this position, wherein as shown in Fig. 1, for example, the two strings of the looped end B nearest to the tagging mechanism are separated so that one of them may be engaged by the hooked end 25 of a reciprocating needle 26 forming part of the tagging mechanism.

Figures 4, 5:
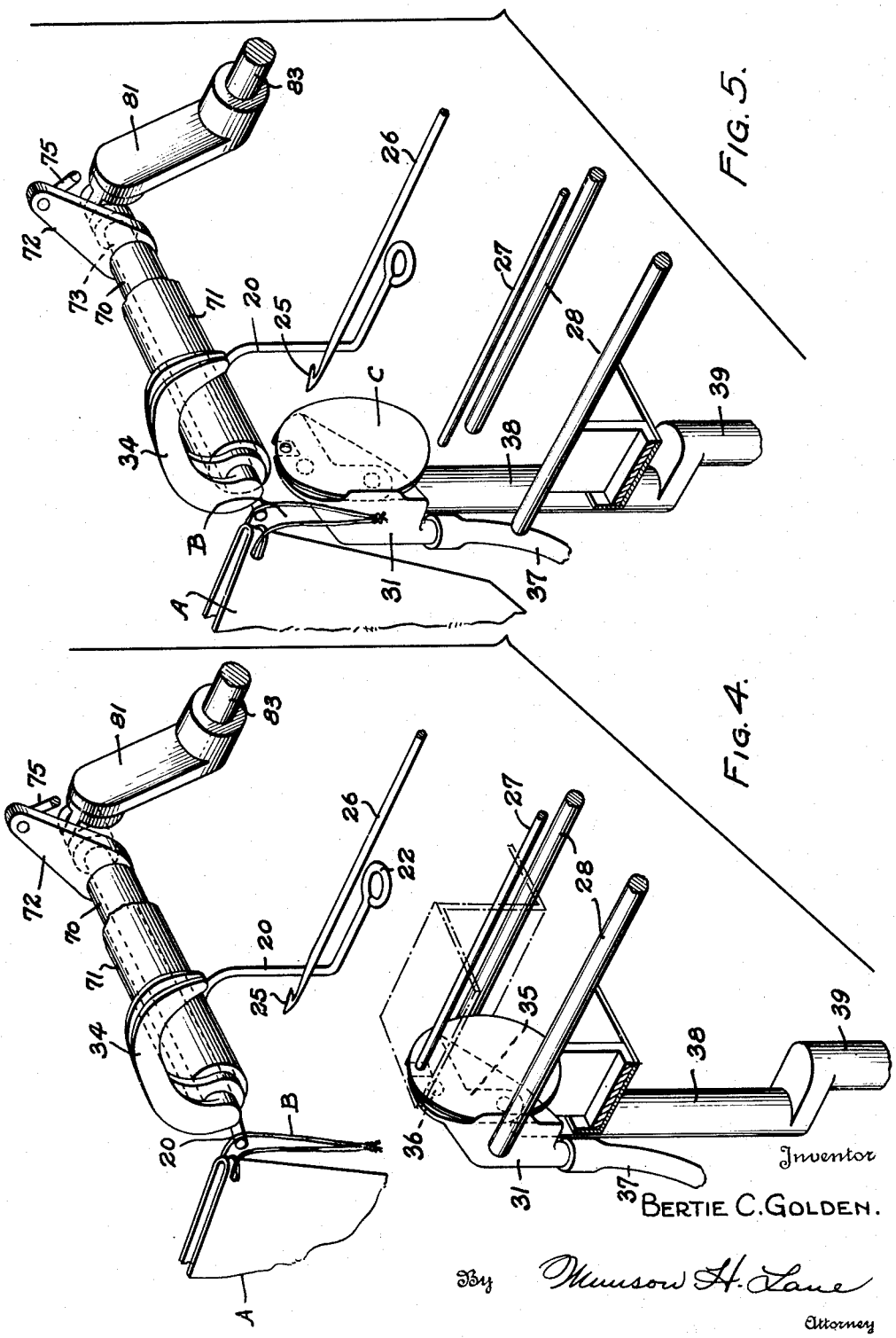

The relative positions of the principal coacting parts of the tagging mechanism when a bag has just been brought to the tagging position, are best shown in Fig. 4 and subsequent positions in Figs. 5, 6, 7, 8 and 9. As best shown in Fig. 11 a plurality of tags C each having an aperture therein are supported upon a fixed wire 27 which extends from front to rear of the machine. Side bars 28, 28 serve to prevent rotation of the tags with reference to the wire 27 and a spring pressed presser rod 29 (Fig. 1), slidably mounted in a fixed bearing member 30, engages the rearmost of the tags and forces the tags along the wire 27 toward a reciprocatory tag feeding member 31 (Fig. 4). As shown rod 29 is pressed against the tags by means of a spring 32 having one end fixed to a portion of the frame and the other end attached to a collar or the like 33 at the rear end of the presser rod (Fig. 1).

The tag carrying or feeding mechanism 31 is designed to move one tag at a time from the tag supporting wire 27 into proximity with the draw strings B of the bag to be tagged, with the tag aperture in alignment with the line of travel of the needle 26, in which position the tag is held while the hook 25 on the end of the needle passes through the tag aperture to engage one strand of the looped end B as illustrated in Fig. 6, after which the needle hook 25 carrying the loop B is moved in the opposite direction until it reaches the position shown in Fig. 7 at which time the hooked bill of a tag gripper member 34 commences to descend between the two strands of the loop B preparatory to engaging the tag. At the same time the tag carrying member 31 begins to rotate about its longitudinal axis carrying the tag with it until it has rotated 90°, thus bringing the tag into the plane of movement of the tag gripper bill 34, which position is shown in Fig. 8. Meanwhile the bill of the gripper member has opened so that one portion passes on one side and the other on the other side of the tag, after which the two parts of the bill are forced toward each other gripping the tag, and the bill carrying with it the tag is then lifted up through the loop in the draw string (Fig. 9) while the hook 25 holds the loop B taut, thereby securely fastening the tag C to the bag string B, the tagged article being illustrated in Fig. 10.

After the tag has been secured to the loop the hook 25 releases said loop, the bag supporting members 10 release the bag A, and the tag holding member 31 releases the tag, after which the member 31 is again rotated 90° about its axis and is also moved downwardly to the original position shown in Fig. 4 in which it is ready to pick up another tag.

It will be understood that various means for performing the operations recited above may be employed within the scope of my invention and the particular mechanism actually shown in the drawings is intended merely by way of illustration and not by way of limitation.

In its preferred embodiment the tag carrying mechanism is provided with a suction head having a flat face 35 against which a tag is adapted to be drawn by suction through the medium of a plurality of openings 36 communicating through suitable passages with a flexible suction pipe 37 connected to any suitable source of supply (not shown). The suction head is carried upon a post 38, which in turn is carried upon a vertical shaft 39 mounted for oscillating and reciprocating movement within a bearing member 40 carried by the frame. Vertical reciprocatory movement is imparted by means of a lever 41 secured to the lower end 42 of the shaft 39 and hinged at its other end 43 to the frame of the machine. The lever 41 is actuated by means of a link 44 pivoted at 45 to a lever 46 which in turn is pivoted at its rear end 406 to a transverse shaft 47 (Fig. 3) carried by the frame. Intermediate its ends the lever 46 is provided with a cam roller 48 which fits in a cam groove 49 (Figs. 3 and 12) formed in one face of a rotary cam 50 mounted on a cam shaft 51 actuated from any suitable source of power (not shown).

Oscillating movement is imparted to the shaft 39 through suitable linkage from a cam 52 also carried by the cam shaft 51. As shown (Fig. 1) a collar 53 is secured to the shaft 39 just below the bearing 40, which collar is provided with a link 54 connected to a rod 55 pivotally connected to one arm 56 of a bell crank 57 pivotally connected at 58 to a fixed member 59 carried by the frame of the machine. The other arm 60 of the bell crank is connected to a link 61 which in turn is connected to a lever 62 actuated by a groove 52a in the cam wheel 52 and is hingedly connected at its rear end 602 to the cross rod 47. The lever 62 is provided with a cam roller (not shown) similar to the roller 48 which coacts with the cam groove 49 in the surface of cam wheel 50. Thus by rotation of the cam 52 oscillatory movement is imparted to the shaft 39 through the intermediate linkage described above.

Figure 2:
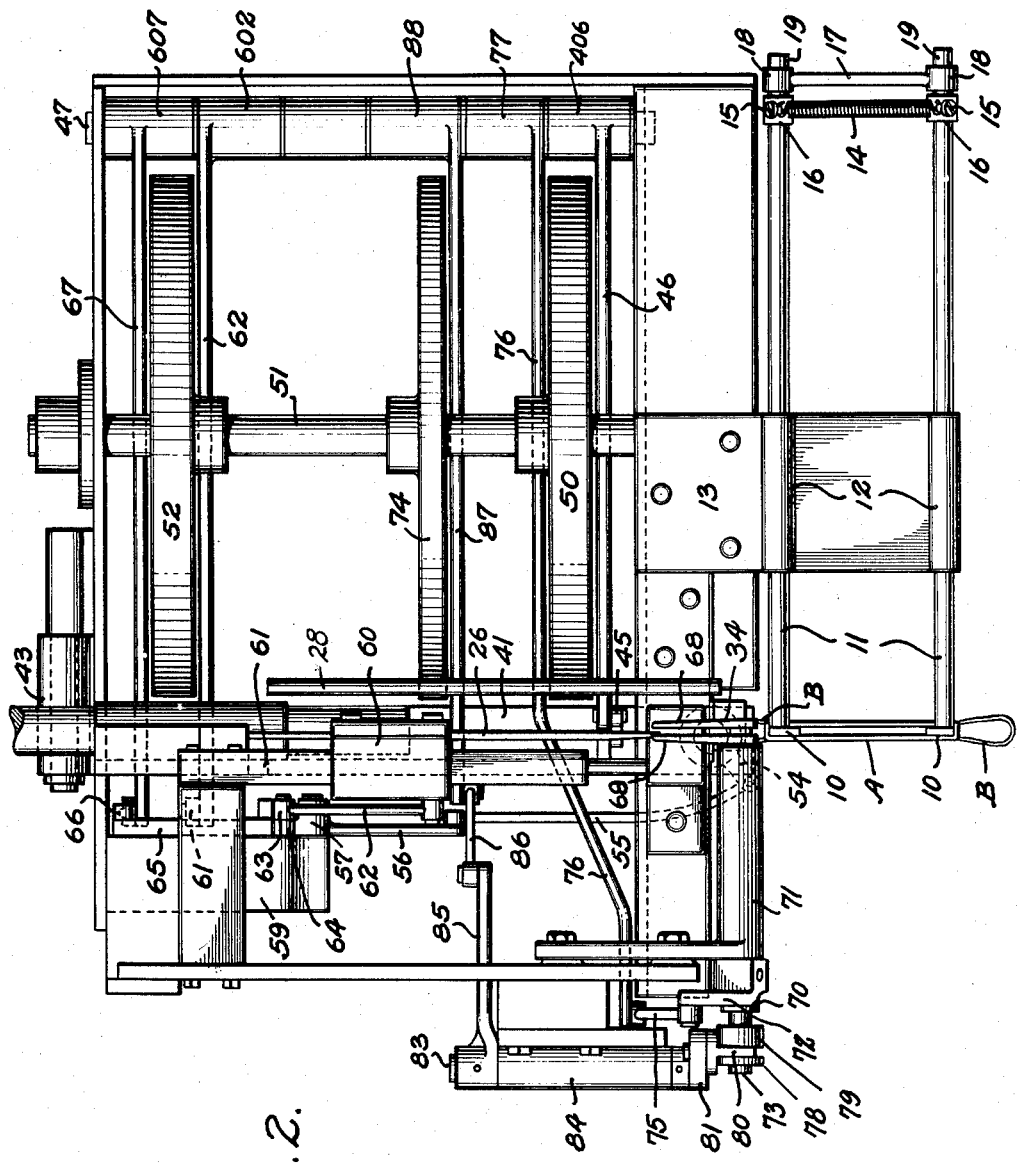
Fig. 2 is a top plan view of the same.

Intermittent reciprocatory movement, with suitable intervals of dwell, is imparted to the hooked needle 26 from the face of the cam wheel 52 opposite that which imparts oscillating movement to the shaft 39 upon which the tag carrying member 31 is mounted, although obviously an entirely separate cam wheel might be employed if desired. The mechanical connections between the needle and the cam will now be described. As shown in Figs. 1 and 2 the needle extends from the forward end of a carriage 60 slidably mounted upon a fixed bar 61 carried by the frame. A link 62 is attached at the side of the carriage and is connected to one arm 63 of a bell crank pivoted at 64 to the frame member 59. The other arm 65 of the bell crank is pivoted to a connecting rod 66 which in turn is pivoted to a lever 67 hingedly connected at its rear end 607 to shaft 47 and provided intermediate its ends with a cam roller (not shown) which engages a suitably shaped cam groove (not shown) in the face of the cam wheel 52 opposite the face which actuates the lever 62. Rotation of the cam wheel 52 causes the needle 26 to reciprocate in timed relation to the cooperating parts of the tagging mechanism. Actuated by the rotation of said cam wheel the needle moves forwardly from the position shown in Fig. 4, through the opening in the tag C, to the forward position shown in Fig. 6 to engage the draw string B, then is retracted carrying with it the draw string to the rearmost position shown in Fig. 7, out of the path of the tag gripper 34, which position is maintained during the operations shown in Figs. 8 and 9 and until the tag is secured to the draw string, when the needle again moves forward, releasing the draw string, then rearwardly to the initial position shown in Fig. 4, after which the cycle of operations is repeated.

The tag gripping member 34 performs two distinct functions, first that of spreading apart the strands of the draw strings B as illustrated in Fig. 7, and second, that of gripping the tag C and lifting it through the separated strands as indicated in Figs. 8 and 9. This requires two distinct movements of the gripper, one a swinging movement in a vertical plane, and second a reciprocatory movement of one of the pair of gripper jaws 68, 69 toward or from the other, for the purpose of grasping or releasing the tag.

As shown the jaw 68 is carried by a sleeve 70 which is rotatably mounted within a fixed housing 71 secured to a portion of the frame of the machine. The sleeve 70 projects rearwardly beyond the housing and is provided with a link 72 by means of which timed oscillatory movement is imparted to the sleeve 70 and to the gripper members 68 and 69 carried thereby, the gripper member 69 being carried at the end of an inner splined shaft 73 which is movable axially with respect to the sleeve 70, but rotates therewith due to the splined connection. Oscillatory movement is imparted to the link 72 and sleeve 70 by rotation of the cam wheel 50, and reciprocating movement is imparted to the inner shaft 73 by rotation of a cam wheel 74 mounted upon drive shaft 51, through suitable linkage which will now be described.

As best shown in Fig. 2, the link 72 is connected through a rod 75 with a lever 76 pivoted at its rear end 77 to the shaft 47, and provided intermediate its ends with a cam roller (not shown) adapted to ride in a suitably shaped cam groove 49a (Fig. 16) formed in the face of cam wheel 50 opposite that which imparts movement to the lever 46. Starting with the parts in the position shown in Fig. 4, the gripper 34 remains motionless during the operations shown in Figs. 5 and 6, but after the needle 26 has gripped the draw string and has moved rearwardly a suitable disstance, the gripper 34 commences to move downwardly and in the position shown in Fig. 7 passes through the strands of the loop B separating the same, then moves down to the position shown in Fig. 8 where the gripper members 68 and 69 are separated so as to pass on each side of the tag, after which the gripper moves upwardly to the position shown in Fig. 9, carrying with it the tag, the movable member 69 having first been moved toward the member 68 so as to grip the tag, by imparting axial movement to the shaft 73 which carries the movable gripper member 69.

For imparting reciprocatory movement to the shaft 73, a pair of collars 78, 79, and a fork 80 carried by a crank arm 81 secured to one end of a shaft 83 supported by a fixed housing 84 secured to the frame of the machine. A second crank arm 85 secured to the opposite end of the shaft 83 is connected through link 86 to a lever 87 pivoted at its rear end 88 to the fixed shaft 47 and actuated intermediate its ends by a cam groove 74a in one face of the cam wheel 74 mounted on cam shaft 51, the lever 87 being provided with a suitable cam roller (not shown) for engagement in said cam groove. Through the connections just described rotation of the cam wheel 74 serves to impart reciprocatory movement to the splined shaft 73 carrying the movable gripper arm 69 in timed relation to the other parts of the tagging mechanisms. Thus, starting with the parts in the position shown in Fig. 4, the two gripper members 68 and 69 are separated and remain separated until the gripper bill starts downwardly, to the position shown in Fig. 7, when the shaft 73 is retracted carrying with it the front gripper member 69, so that the gripper bill 34 is closed at the time it is inserted between the two strands of the draw string B. As the grippers move downwardly toward the position shown in Fig. 8 the movable gripper member 69 is moved away from the fixed member 68 to allow the tag C to pass between them, after which the member 69 is again moved toward the member 68 so as to grasp the tag preparatory to lifting the same upwardly through the loop B. After the tag has been secured to the draw string the grippers 68 and 69 are again separated to release the tag, and remain separated until the bill 34 again descends for the separation of the strands in the next cycle of operations.

The various parts of the device have been described in detail for the purpose of illustration but it will be obvious that many variations and modifications may be resorted to without departing from the spirit of the invention. Thus, while the pneumatic tag lifting device has been described in the preferred embodiment of the invention it will be obvious that a mechanical pick-up may be employed for this purpose. Furthermore, while in the apparatus shown an unfilled bag has been illustrated it is contemplated that the invention may be applied to the tagging of filled bags. It will also be obvious that various mechanical means for actuating the principal parts of the mechanism in the timed relation to one another may be substituted for the particular mechanical expedients disclosed in the present application by way of illustration.

I claim:

1. In a machine for applying tags to looped strings of tobacco bags or the like, means for supporting a bag having a projecting loop in proximity to tagging mechanism, means for delivering an apertured tag into proximity to the loop, a hooked needle having means for moving the same through the aperture in the tag to engage said loop, and for retracting the same carrying the loop with it through the aperture in the tag, means for separating the strings of the loop held by the hooked needle and for grasping the tag and passing the same through the separated strings.

2. In a machine for applying tags to looped strings of tobacco bags or the like, means for supporting a bag having a projecting loop in proximity to tagging mechanism, means for delivering an apertured tag into proximity to the loop, a hooked needle having means for moving the same through the aperture in the tag to engage said loop, and for retracting the same carrying the loop with it through the aperture in the tag, means for separating the strings of the loop held by the hooked needle and for grasping the tag and passing the same through the separated strings, the said tag delivering means including a vacuum head.

3. In a machine for applying tags to looped strings of tobacco bags or the like, means for supporting a bag having a projecting loop in proximity to tagging mechanism, means for delivering an apertured tag into proximity to the loop, a hooked needle having means for moving the same through the aperture in the tag to engage said loop, and for retracting the same carrying the loop with it through the aperture in the tag, means for separating the strings of the loop held by the hooked needle and for grasping the tag and passing the same through the separated strings, the said tag grasping means comprising a pair of separable fingers.

4. In a machine for applying tags to looped strings of tobacco bags and the like, tagging mechanism, means for presenting a bag to the tagging mechanism, means associated with the tagging mechanism for supporting a plurality of apertured tags, a suction head for withdrawing one tag at a time from the supporting means and for delivering the same into proximity with the bag strings to be tagged, said tagging mechanism including means for drawing the string through the aperture in the tag, and means for separating the strands of the loop and for passing the tag through the loop.

5. A tagging machine for applying tags to the looped strings of tobacco bags and the like comprising a tag carrying member having vertical reciprocatory movement and oscillatory movement about its vertical axis, a hooked needle adapted to draw the looped strings through an aperture in a tag to be applied and hold it taut, tag gripper fingers having means for moving the same between the looped strings into position to engage a tag, and means for separating the fingers to permit the tag to pass between them endwise, and for causing them to grip the tag, and means for withdrawing the gripper fingers carrying the tag entirely through the loop while said loop is held taut, whereby the tag is secured to said loop.

6. A machine for applying tags to looped strings of tobacco bags and the like, comprising tag carrying means adapted to move a tag into proximity with the looped strings, a reciprocatory hook having means for moving the hook through an aperture in the tag to engage a strand of said loop and withdraw the same through the aperture to a position at which the loop is taut, a tag gripper adapted to pass through the loop to separate the strands thereof, means for rotating the tag carrying means to bring the tag into edgewise position with reference to the gripper, means for actuating the gripper to engage said tag and means whereby the gripper is passed through the loop to engage the tag and is withdrawn with the tag through the loop after the tag has been gripped, said gripper having gripper jaws provided with means for opening and closing said jaws for gripping and releasing the tag; the operation of drawing the tag through the loop while the loop is held taut serving to secure the tag to said loop.

7. A machine for applying apertured tags to looped strings of tobacco bags and the like, comprising means for supporting a bag and its strings in proximity to tagging mechanism, said tagging mechanism including a reciprocating needle having means for moving the same in a rectilinear path through an aperture of a tag to be applied to engage a strand of said loop and draw it through said aperture to a taut position, a tag carrying member having means for presenting the tag with its aperture in alignment with the path of travel of the needle, a combined strand separating and tag gripping mechanism including a bill adapted to be inserted through the loop while held taut by said needle, said bill having a pair of tag grasping fingers, means for actuating said fingers to grasp said tag, means for moving the bill in one direction through the loop to separate the strings and to grasp the tag, and for withdrawing the same with the tag grasped between said fingers through the said loop, said tag carrying member having means for rotating the same to present the tag edgewise to the gripping fingers.

8. In a tagging machine for tobacco bags and the like, means for supporting a bag having a projecting loop in proximity to tagging mechanism, means for delivering an apertured tag into proximity to said loop, means for drawing the loop through said aperture and supporting the end thereof and means for separating the strands of the supported loop and for drawing the tag completely through said supported loop to secure the tag to the loop.

9. In a tagging machine for tobacco bags and the like, means for delivering successive bags each having a projecting loop, one at a time in proximity to tagging mechanism, means for delivering successive apertured tags one at a time into proximity to the loop of a supported bag, means for drawing the loop of the supported bag through the aperture in the tag adjacent thereto and supporting the end of the loop remote from the bag, and means for separating the strands of the supported loop and for drawing the tag completely through the supported loop to secure the tag thereto.

10. In a machine for applying tags to tobacco bags and the like each having a projecting loop, tagging mechanism, means for presenting a bag to the tagging mechanism, means associated with the tagging mechanism for supporting a plurality of apertured tags, means for withdrawing one tag at a time from the supporting means and for delivering the same into proximity with the bag strings to be tagged, said tagging mechanism including means for drawing the projecting loop of the bag through the aperture in the tag and means for separating the strings of the loop and for passing the tag through the loop.

BERTIE C. GOLDEN.